Sept. 21, 1948.　　　　J. F. SAWYER　　　　2,449,753
FISH SCALING DEVICE
Filed Feb. 24, 1944
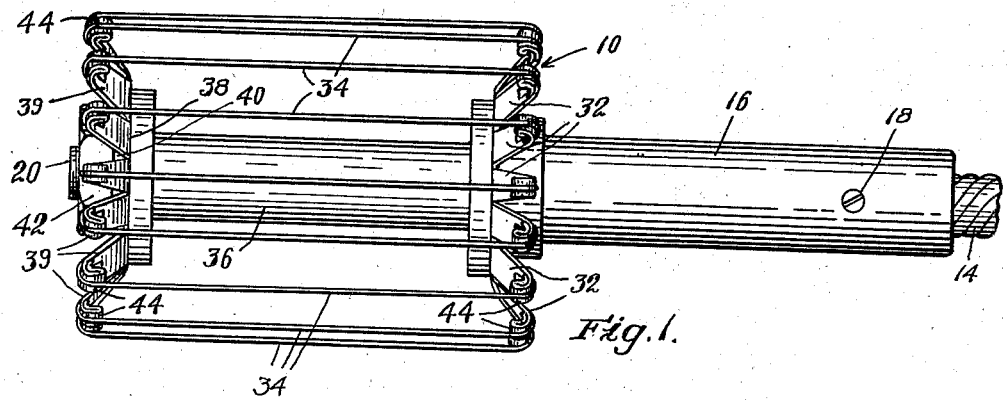
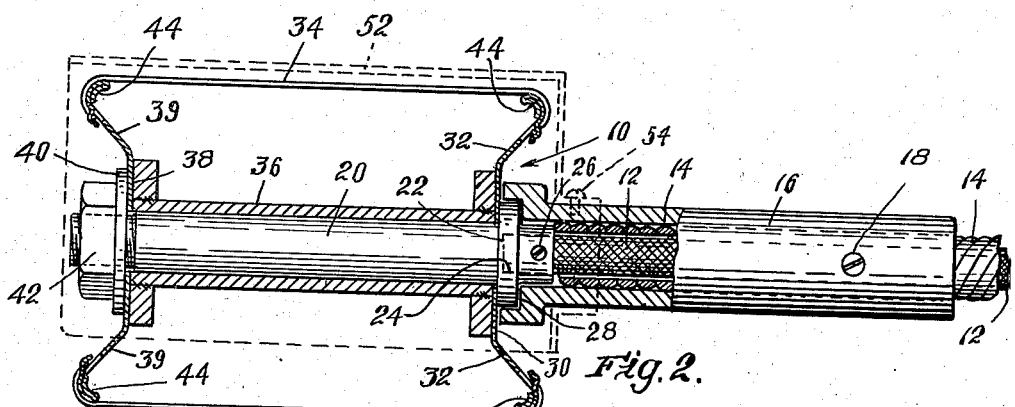
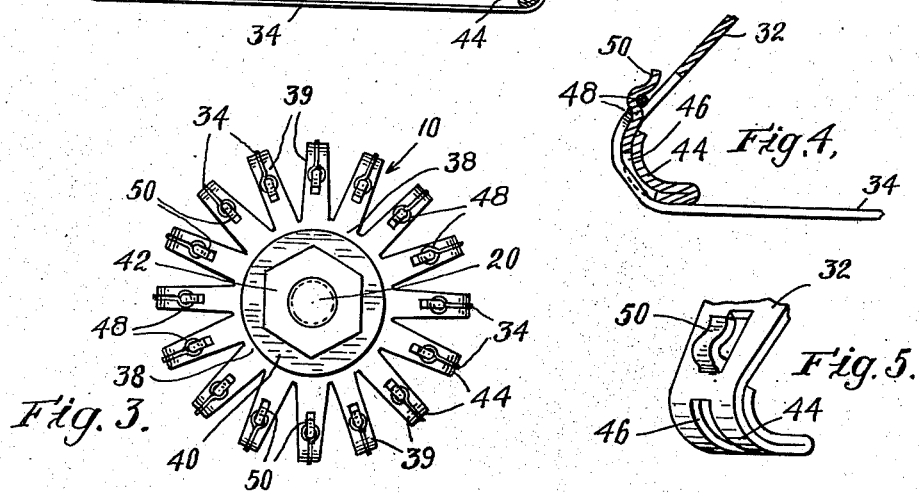
Inventor.
John F. Sawyer
By his Atty
John H. McKenna Patented Sept. 21, 1948

2,449,753

UNITED STATES PATENT OFFICE 2,449,753

FISH SCALING DEVICE

John F. Sawyer, Millis, Mass.

Application February 24, 1944, Serial No. 523,698

6 Claims. (Cl. 17—5)

This invention relates to improvements in fish scaling devices. More particularly it relates to power driven fish scalers of the general type adapted to be manually held and moved over the surface of a fish which is being scaled.

Heretofore it has been customary to scale fish with a scaling device having a power driven rotating head equipped with a series of blades, either spiral or straight, or equipped with a multiplicity of lugs projecting radially from a cylindrical surface of the head. In the latter case, the lugs are ground flat on their outermost surfaces to provide cutting edges. In the former case the blades also are in the nature of cutters. In use of these prior art scalers it frequently happens that a fish, whose fleshly surface may have a break in it, becomes torn to bits when the scaler is moved over the broken surface. The blades or cutting lugs catch under the skin and in the fleshly part of the fish at the region of the break and often rip the fish to an extent rendering it practically useless. Also the prior art blades and cutting lugs are rigid and non-yielding and tend to tear the fish if a scale or a group of scales unduly resists when engaged by a scaling element. Furthermore, the blades or lugs become dulled after an extended period of use and unless re-ground periodically, the devices become ineffective for scaling.

It is among the objects of my present invention to provide a fish scaler of the rotating head type wherein the scale removing elements may be small wires, or other suitably strong and durable linear elements, extending in general parallelism with the axis of the head and in spaced relation around the head. Preferably the wires or other linear elements will be of such small cross-section that they can readily engage under any of various sizes of fish scales as the rotating head is manually moved over the surface of a fish. The wires may have considerable unsupported extent between spaced supports at opposite ends of the head, each wire being generally taut but having ability to yield somewhat resiliently as by being resiliently held at its opposite ends on rigid supports, or by being mounted on supports which themselves are resilient.

Another object is to provide a fish scaler whose scale removing elements readily and easily may be replaced individually when worn or broken.

Still another object of the invention is to employ a scaling structure which permits use of readily available material for the scaling elements, and at small cost.

It is, moreover, my purpose and object generally to improve the structure and operation of power driven, manually applied fish scalers.

In the accompanying drawing:

Figure 1 is a side elevation of a fish scaler embodying features of my present invention;

Figure 2 is a view similar to Figure 1 but with parts shown in medial vertical cross-section, and showing a shield in dotted outline mounted on the handle and shielding a major part of the fish scaling head;

Figure 3 is an end elevation looking from the left in Figure 1;

Figure 4 is a cross-sectional detail, on a larger scale, showing the manner of mounting and securing the ends of the scaling elements; and Figure 5 is a perspective of a fragment of one of the resilient supports for a scaling element.

Referring to the drawing, the fish scaling head 10 is secured to one end of a flexible drive shaft 12 which extends through the flexible casing 14 from a suitable power source, not shown. The flexible shaft 12 and its casing 14 extend within the hollow of a cylindrical handle 16 which is secured to the casing 14 in any convenient and effective manner, as by one or more set screws 18.

The scaling head 10 comprises an axial shaft 20 having the annular flange 22 spaced somewhat from one end, and that end of shaft 20 is provided with an axial bore 24 for receiving the end of the flexible shaft 12. One or more set screws 26 may secure the flanged shaft 20 on the end of the flexible shaft, to rotate therewith. Flange 22 seats rotatably in a recess 28 in the inner end of the handle 16, the flange preferably being a little wider than the depth of recess 28 so that the flange projects out of the recess for spacing a scale element supporting member 30 away from the end of the non-rotating handle 16.

The supporting member 30 is represented as a disk of spring metal having an axial hole through which head shaft 20 extends, and having a series of spring fingers 32 bent out of the plane of the body of the member, each finger being formed or provided with means for receiving and removably holding one end of a linear scaling element 34.

Supporting member 30 is clamped against flange 22 by a sleeve 36 on the head shaft 20, the sleeve having a flange at each end for engaging and steadying respectively the supporting member 30 and a corresponding supporting member 38 which is clamped between the sleeve flange and a washer 40 by a nut 42 screwed on the outer end of the head shaft 20. Hence, when nut 42 is tightened, the head shaft 20, sleeve 36 and both supporting members 30, 38 are clamped together for rotation as a unit with the flexible power shaft 12.

According to my invention, the scale engaging elements 34 may be small diameter wires, or other suitably strong linear elements, extending between the resilient fingers of the supporting members 30, 38. As represented, relatively stiff and strong wires are employed, each extending from a resilient finger 32 of member 30 to an oppositely disposed resilient finger 39 of member 38, each finger being doubled over upon itself at its end and formed to provide a curved terminal, as at 44, over which the wire extends. The fingers may be grooved to prevent lateral displacement of the wires or, as shown in Figs. 4 and 5, a slot 46 may be formed in the outer curved part of each finger to receive the wire as it passes over the terminal and downward to a suitable securing means on each finger. Preferably the wires are secured so as to be easily removable for replacement of worn or broken wires. Conveniently, a loop 48 may be formed at each end of the wire elements 34, for engaging under an out-set tongue 50 on each finger. Due to the resiliency of the fingers, they may be flexed sufficiently to permit engagement of the loop ends of the wires over the tongues, and then they inherently spring back to maintain the wires taut in their unsupported extents between supports.

If desired, a suitable shield may be provided around the main extent of the rotating head, with its bottom side open. In Fig. 2 I have indicated such a shield in dotted outline at 52, secured to handle 16 by one or more screws 54.

My improved fish scaler is adapted for use in the same manner as the prior devices, by being manually moved over the surface of a fish. However, it will be obvious that my linear scaling elements can flex somewhat to more readily conform to the surface contour which is being traversed by the head and hence the scaling elements more effectively can engage under the scales and cause their removal. Also, because there is yieldability inherent in my improved structure, there is greatly minimized danger of tearing a fish if one or a group of scales unduly resists removal. Then too, because there are no cutting surfaces or projections acting on the fish, but only smooth linear elements, my improved scaler can work over broken places in the skin or fleshly part of a fish without digging in and ripping the fish as has been a prevalent happening with the prior devices.

The ease and simplicity with which worn or broken linear elements may be replaced, coupled with the economy of such replacements, as well as the low initial costs involved, constitute important improvements over comparable prior fish scaling devices.

I claim as my invention:

1. In a fish scaling device, a rotatable head comprising an axially extending element having means at one end for securing it to a power shaft to rotate therewith, a plurality of end members spaced apart on said axial element and having resilient portions extending radially outward from said axial element, means securing said end members in their spaced relation and against rotation on said axial element, a series of wires extending from one to another of said end members in general parallelism with the axis of rotation of the head and in spaced relation around said axis, and means removably securing end portions of the individual wires to said resilient portions of said end members.

2. In a fish scaling device, a handle, a head rotatably mounted at one end of the handle and including an axially extending element having means thereon for securing it to a power shaft to rotate therewith, said head having a plurality of members spaced apart on said axially extending element, and each of said members having resilient portions projecting radially outward in spaced relation around said axially extending element, a series of thin, flexible linear elements extending from one to another of said spaced apart members in general parallelism with the axis of rotation of the head and in spaced relation around said axis, and means removably securing end portions of the individual flexible linear elements to said resilient portions of said spaced apart members with said resilient portions maintaining the linear elements constantly under tension.

3. In a fish scaling device, a rotatable head, relatively stationary means for supporting the head, means within said relatively stationary means for connecting the head to a drive shaft for rotation therewith, a spring metal member at each end of the head and rotatable therewith, each said member having a series of integral radially projecting resilient fingers equally spaced around the axis of the head, a series of thin and flexible linear elements, each extending from a resilient finger on one said spring metal member to an oppositely disposed resilient finger on the other said spring metal member, and means removably securing opposite ends of the individual linear elements to the fingers between which they extend with the fingers maintaining the linear elements constantly under tension.

4. In a fish scaling device, a rotatable head comprising an axially extending member having means at one end for connection to a drive shaft, a pair of end members, means for clamping said end members to said axially extending member in axially spaced relation, each said end member having resilient portions projecting radially in spaced relation around the axis of the head, a series of flexible linear elements extending between oppositely disposed resilient portions of said end members, and means removably securing opposite ends of the linear elements to said resilient portions of the end members with said linear elements disposed radially outward of the said resilient portions of the end members.

5. In a fish scaling device, a rotatable head comprising axially spaced end members, means securing the end members together in their spaced relation for rotation in unison, each said end member having radially projecting resilient portions spaced around the axis of the head, and a series of flexible linear elements stretched across from end member to end member and each secured at its opposite ends to a said resilient portion of each end member, each said linear element extending over the radially outermost ends of the resilient portions of the end members whereby the linear elements are set radially outward of the end members.

6. In a fish scaling device, a rotatable head comprising axially spaced end members, means clamping said end members in their said axially spaced relation, each said end member having a series of resilient portions extending outward from its clamping means and extending also obliquely in general direction away from the other end member whereby the outer ends of said resilient portions on the two end members are spaced axially apart a distance greater than the axial spacing of the clamped portions of the end members, a series of flexible linear elements extending between the resilient portions of the two end members and engaged over the outermost surfaces of the resilient portions, and means removably securing the linear elements to said resilient portions with each element set radially outward of the resilient portions.

JOHN F. SAWYER.

REFERENCES CITED

The following references are of record in the file of this patent:

UNITED STATES PATENTS

| Number | Name | Date |
|---|---|---|
| 391,698 | Frey | Oct. 23, 1888 |
| 1,324,581 | Boesch et al. | Dec. 9, 1919 |
| 1,775,693 | Price | Sept. 16, 1930 |
| 2,154,187 | Scoville | Apr. 11, 1939 |
| 2,154,420 | Crapo | Apr. 18, 1939 |
| 2,333,855 | Gascoigne | Nov. 9, 1943 |

FOREIGN PATENTS

| Number | Country | Date |
|---|---|---|
| 741,061 | France | Dec. 2, 1932 |